(12) United States Patent
Miyashita

(10) Patent No.: US 9,813,640 B2
(45) Date of Patent: Nov. 7, 2017

(54) IMAGE PROCESSING APPARATUS, IMAGE PROCESSING METHOD, IMAGE PROCESSING PROGRAM, AND NON-TRANSITORY RECORDING FOR CALCULATING A DEGREE-OF-INVALIDITY FOR A SELECTED SUBJECT TYPE

(71) Applicant: OLYMPUS CORPORATION, Shibuya-ku, Tokyo (JP)

(72) Inventor: Naoyuki Miyashita, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 109 days.

(21) Appl. No.: 14/954,559

(22) Filed: Nov. 30, 2015

(65) Prior Publication Data

US 2016/0232417 A1    Aug. 11, 2016

Related U.S. Application Data

(63) Continuation of application No. PCT/JP2015/053584, filed on Feb. 10, 2015.

(51) Int. Cl.
*G06K 9/00* (2006.01)
*H04N 5/262* (2006.01)
*H04N 5/232* (2006.01)

(52) U.S. Cl.
CPC ....... *H04N 5/2628* (2013.01); *H04N 5/23229* (2013.01); *H04N 5/2621* (2013.01)

(58) Field of Classification Search
CPC ............ G06K 9/2054; G06K 9/00228; H04N 5/23229; H04N 5/2628; H04N 5/2621
(Continued)

(56) References Cited

U.S. PATENT DOCUMENTS

2014/0307974 A1 * 10/2014 Tanaka ................ G06K 9/62
382/218

FOREIGN PATENT DOCUMENTS

JP      2013-011944    *   1/2013   ............ G06T 1/00
JP      2013011944 A       1/2013
(Continued)

OTHER PUBLICATIONS

International Search Report (ISR) and partial translation of Written Opinion (WO) dated Sep. 19, 2015 issued in International Application No. PCT/JP2015/053584.

*Primary Examiner* — Amara Abdi
(74) *Attorney, Agent, or Firm* — Holtz, Holtz & Volek PC

(57) ABSTRACT

With the object of making a user aware of the effect achieved by processing whose details and usage method he or she does not know and encouraging the use of such processing, the invention is an image processing apparatus including a subject recognition circuit that recognizes a subject type existing in an input image; a storage circuit that stores a plurality of processing instruction datasets that represent processing details for processing the input image; a processing instruction dataset obtaining circuit that obtains, from the storage circuit, processing instruction datasets which are predefined according to the subject type recognized by the subject recognition circuit; a processing instruction dataset determining circuit that calculates, for each of the obtained processing instruction datasets, a degree-of-invalidity indicating a degree to which the processing instruction dataset is not suitable for the input image and that selects a prescribed number of the processing instruction datasets for which the degrees-of-invalidity are less than or equal to a prescribed threshold; and an image processing circuit that performs processing of the input image using the prescribed number of selected processing instruction datasets.

14 Claims, 12 Drawing Sheets

(58) Field of Classification Search
USPC ....... 382/118, 181, 190, 209, 159, 224, 306; 348/135, 77
See application file for complete search history.

(56) References Cited

FOREIGN PATENT DOCUMENTS

| JP | 5246592 | * | 7/2013 | ............... G06T 1/00 |
| JP | 5246592 B2 | | 7/2013 | |

* cited by examiner

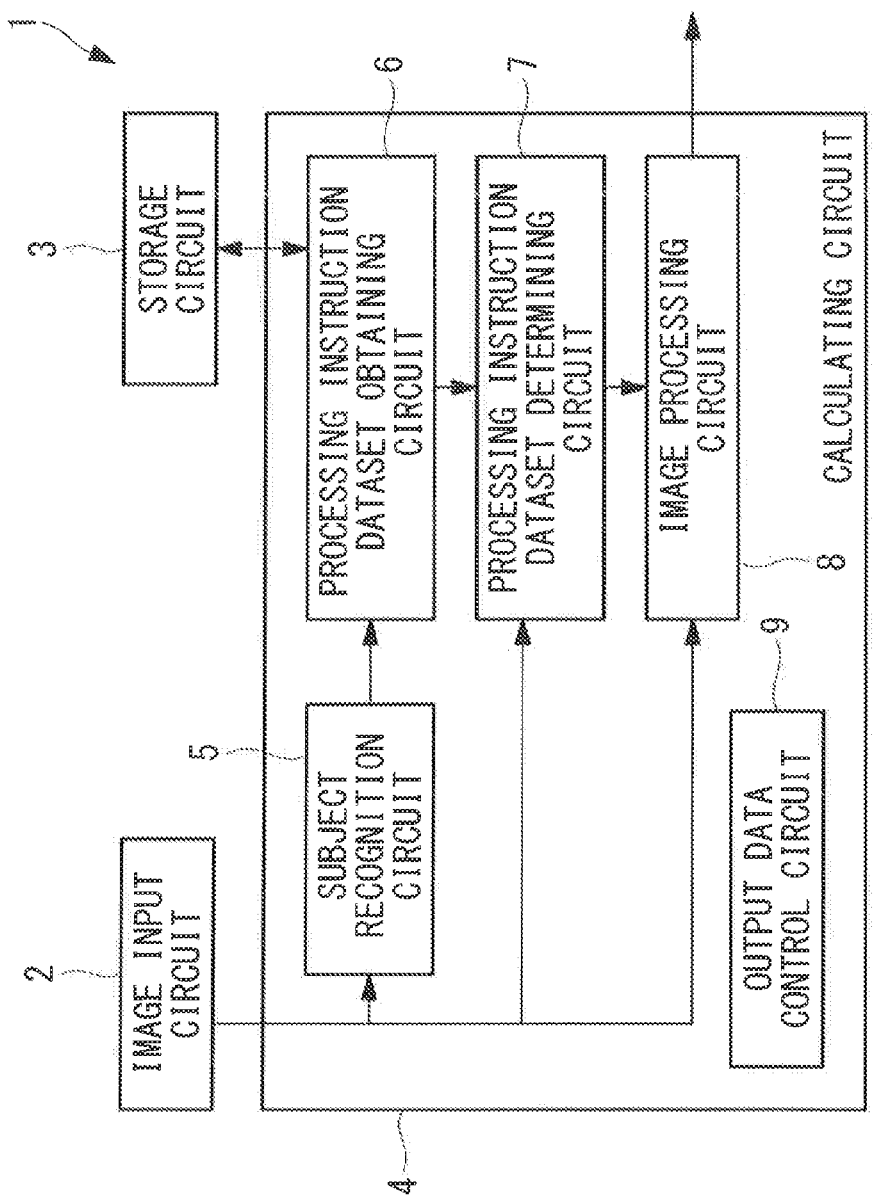

FIG. 2

| PROCESSING INSTRUCTION ID | PROCESSING INSTRUCTION DETAILS (PARAMETERS OF IMAGE CREATING SYSTEM) | | | | PROCESSING INSTRUCTION DETAILS (PARAMETERS OF TRIMMING SYSTEM) | | | |
|---|---|---|---|---|---|---|---|---|
| | FILTER TYPE | WB | TONE CURVE SHADOW | TONE CURVE HIGHLIGHT | TARGET SUBJECT TYPE | TARGET SUBJECT POSITION | ASPECT | ZOOM FACTOR |
| 1 | Filter_A | Auto | 0 | 0 | HUMAN FACE | CENTER | 4:3 | 0.8 |
| 2 | Filter_B | Auto | −3 | +3 | HUMAN FACE | CENTER | 1:1 | AS LARGE AS POSSIBLE |
| 3 | Filter_C | Auto | 0 | +3 | HUMAN FACE | INTERSECTION OF RULE-OF-THIRDS LINES | 16:9 | AS LARGE AS POSSIBLE |
| 4 | Filter_D | Auto | −3 | 0 | HUMAN FACE | INTERSECTION OF RULE-OF-THIRDS LINES | 4:3 | AS LARGE AS POSSIBLE |
| 5 | Filter_E | Auto | 0 | 0 | FOCUS POSITION | INTERSECTION OF RULE-OF-THIRDS LINES | 4:3 | 1.0 |
| ... | ... | ... | ... | ... | ... | ... | ... | ... |

FIG. 9

| PROCESSING INSTRUCTION ID | DEGREE-OF-INVALIDITY DATA | | |
|---|---|---|---|
| | TOTAL INVALID NUMBER | CONTINUOUS INVALID NUMBER | DEGREE-OF -INVALIDITY |
| 1 | 25 | 5 | 0.7 |
| 2 | 4 | 2 | 0.3 |
| 3 | 10 | 3 | 0.2 |
| 4 | 4 | 1 | 0.1 |
| 5 | 0 | 0 | 0.0 |
| ⋮ | ⋮ | ⋮ | ⋮ |

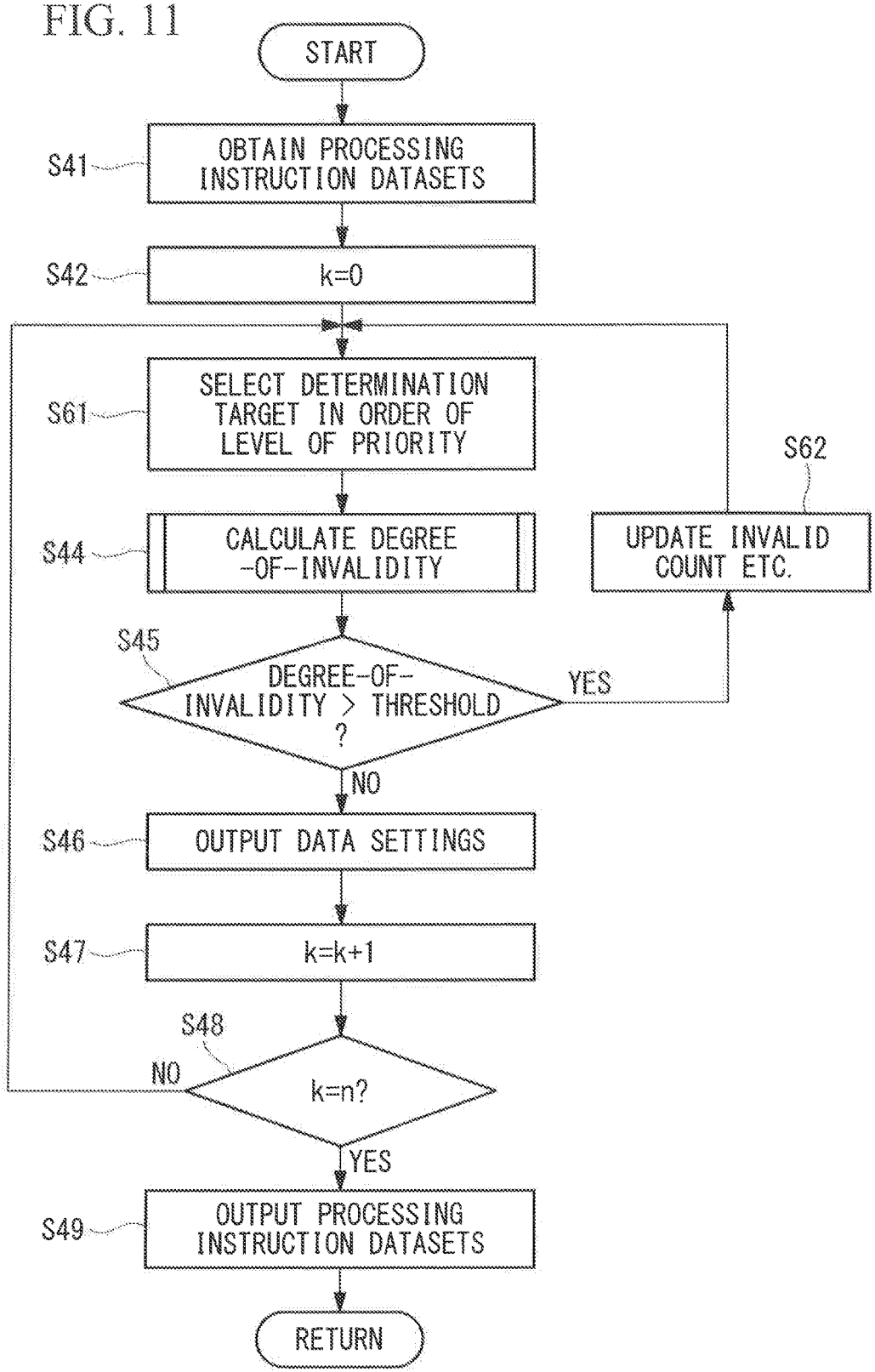

FIG. 12

| DETERMINATION ORDER | HISTORY DATA | | | |
|---|---|---|---|---|
| | TARGET PROCESSING INSTRUCTION ID | TIMESTAMP | INPUT IMAGE NAME | ACCUMULATED NUMBER OF INPUT IMAGES |
| 1 | 5 | yyyyYEAR mmMONTH ddDAY hhHOUR mmMINUTE ssSECOND | 100.jpg | 100 |
| 2 | 4 | yyyyYEAR mmMONTH ddDAY hhHOUR mmMINUTE ssSECOND | 100.jpg | 100 |
| 3 | 3 | yyyyYEAR mmMONTH ddDAY hhHOUR mmMINUTE ssSECOND | 100.jpg | 100 |
| 4 | 2 | yyyyYEAR mmMONTH ddDAY hhHOUR mmMINUTE ssSECOND | 100.jpg | 100 |
| 5 | 1 | yyyyYEAR mmMONTH ddDAY hhHOUR mmMINUTE ssSECOND | 100.jpg | 100 |
| ... | ... | ... | ... | ... |

IMAGE PROCESSING APPARATUS, IMAGE PROCESSING METHOD, IMAGE PROCESSING PROGRAM, AND NON-TRANSITORY RECORDING FOR CALCULATING A DEGREE-OF-INVALIDITY FOR A SELECTED SUBJECT TYPE

TECHNICAL FIELD

The present invention relates to an image processing apparatus, an image processing method, an image processing program, and a recording medium.

BACKGROUND ART

There are known information processing terminals that execute processing specified by corresponding processing information when various conditions are met, such as the case where a user registers one or more items of processing information corresponding to a subject ID, and a subject matching the subject ID is duplicated in a photograph obtained by taking a picture (for example, see Patent Literature 1).

In the information processing terminal in Patent Literature 1, only the processing specified by registered processing information that corresponds to the subject ID is executed.

Among recent cameras, there are many cameras that have a plurality of built-in image processing functions, like filter processing and trimming processing, which are executed according to the user's desire; however, there are few users that can understand all of the functions and use them effectively. In other words, despite the fact that various image processing functions that are suitable for various subjects and photographic scenes are available, and it is possible to offer the user new ways of enjoying image processing if he or she can use them, in some cases they are not used at all.

In the information processing terminal in Patent Literature 1, to execute processing, it is assumed that the user has deliberately registered the processing information corresponding to that processing. Therefore, the user needs to know in advance the details of the processing information and the usage method, and processing whose details or usage method the user does not know cannot ever be used without being aware of even the need for its use.

CITATION LIST

Patent Literature

{PTL 1}
The Publication of Japanese Patent No. 5246592

SUMMARY OF INVENTION

Technical Problem

The present invention has been conceived in light of the circumstances described above, and an object thereof is to provide an image processing apparatus, an image processing method, an image processing program, and a recording medium with which a user can be made aware of an effect achieved by processing whose details and usage method he or she does not know, so that the use of such processing can be encouraged.

Solution to Problem

One aspect of the present invention is an image processing apparatus including a subject recognition circuit that recognizes a subject type existing in an input image; a storage circuit that stores a plurality of processing instruction datasets that represent processing details for processing the input image; a processing instruction dataset obtaining circuit that obtains, from the storage circuit, the processing instruction datasets which are predefined according to the subject type recognized by the subject recognition circuit; a processing instruction dataset determining circuit that calculates, for each of the processing instruction datasets obtained by the processing instruction dataset obtaining circuit, a degree-of-invalidity indicating a degree to which the processing instruction dataset is not suitable for the input image and that selects a prescribed number of the processing instruction datasets for which the degrees-of-invalidity are less than or equal to a prescribed threshold; and an image processing circuit that performs processing of the input image using the prescribed number of processing instruction datasets selected in the processing instruction dataset determining circuit.

Advantageous Effects of Invention

The present invention affords an advantage in that a user can be made aware of an effect achieved by processing whose details and usage method he or she does not know, so that the use of such processing can be encouraged.

BRIEF DESCRIPTION OF DRAWINGS

FIG. 1 is a block diagram showing an image processing apparatus according to an embodiment of the present invention.

FIG. 2 is a diagram showing an example of processing instruction datasets stored in a storage circuit of the image processing apparatus in FIG. 1.

FIG. 9 is a diagram showing an example of degree-of-invalidity data stored in the storage circuit.

FIG. 11 is a flowchart showing details of a processing instruction dataset selection routine in the flowchart in FIG. 10.

FIG. 12 is a diagram showing another example of degree-of-invalidity data stored in the storage circuit.

DESCRIPTION OF EMBODIMENT

Figure 3A:
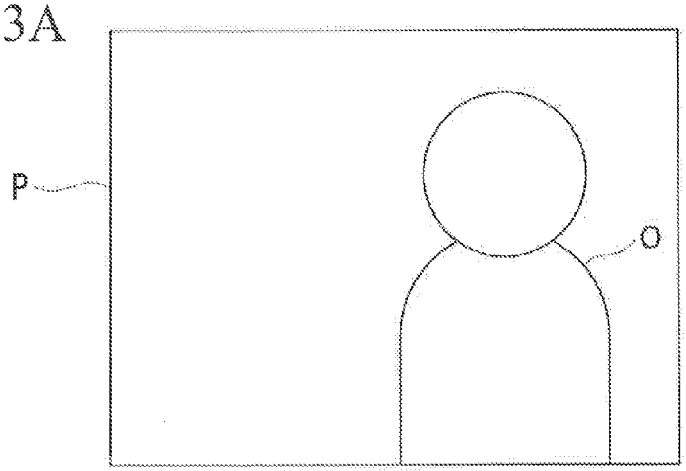
FIG. 3A is a diagram showing an example of an input image.

An image processing apparatus 1 and an image processing method according to an embodiment of the present invention will be described below with reference to the drawings.

As shown in FIG. 1, the image processing apparatus 1 according to this embodiment includes an image input circuit 2 to which an image (input image) P obtained by an image-acquisition apparatus such as a camera is input, a storage circuit 3 that stores processing instruction datasets for the input image P, and a calculating circuit 4 that processes the input image P which is input to the image input circuit 2 on the basis of the processing instruction datasets stored in the storage circuit 3.

The calculating circuit 4 includes a subject recognition circuit 5 that performs known recognition processing on the input image P input to the image input circuit 2, to recognize the type of a subject O (subject type), and a processing instruction dataset obtaining circuit 6 that obtains processing instruction datasets from the storage circuit 3 on the basis of the subject type recognized by the subject recognition circuit 5. The calculating circuit 4 also includes a processing instruction dataset determining circuit 7 that calculates, based on the input image P, degrees-of-invalidity of the processing instruction datasets obtained by the processing instruction dataset obtaining circuit 6 and selects a plurality of processing instruction datasets having low degrees-of-invalidity; an image processing circuit 8 that performs processing on the input image P using the processing instruction datasets selected by the processing instruction dataset determining circuit 7; and an output data control circuit 9 that controls the subject recognition circuit 5, the processing instruction dataset obtaining circuit 6, the processing instruction dataset determining circuit 7, and the image processing circuit 8.

As shown in the example in FIG. 2, the storage circuit 3 stores, in association with target subject types (subject types) which have the possibility of being recognized, a plurality of processing instruction datasets that are suitable for those target subject types. In the example shown in FIG. 2, the target subject types include human face, focus coordinates, and so forth. The target subject types are not limited to these examples, and any other types of subjects can be used. Also, this embodiment is described in terms of a case where the processing details for the processing instruction dataset include trimming.

According to the example in FIG. 2, the processing details for the processing instruction dataset corresponding to trimming include the positions of the target subject O, the aspect ratios, the zoom factors, and so forth. The positions of the target subject O include the center position, the intersection position of the rule-of-thirds lines, and so forth. The aspect ratios include 4:3, 1:1, 16:9, and so forth. The zoom factors include fixed magnifications (1.0, 0.9 etc.), as large as possible, as small as possible, and so forth.

With the target subject type recognized by the subject recognition circuit 5 serving as a key, the processing instruction dataset obtaining circuit 6 searches the storage circuit 3 and obtains a preset number of processing instruction datasets from the processing instruction datasets in FIG. 2, which are stored in association with the target subject types.

The number of obtained processing instruction datasets is set to a value larger than the number of output processing instruction datasets for which the final output is expected.

For each of the processing instruction datasets obtained by the processing instruction dataset obtaining circuit 6, the processing instruction dataset determining circuit 7 calculates a degree-of-invalidity therefor, and makes a determination as to whether it is invalid; if the degree-of-invalidity is lower than a prescribed threshold, the processing instruction dataset determining circuit 7 selects that data as a processing instruction dataset to be output, and if the degree-of-invalidity is higher than the threshold, that dataset is excluded.

Here, the degree-of-invalidity that the processing instruction dataset determining circuit 7 calculates will be described.

The degree-of-invalidity is a value indicating the degree to which the processing instruction dataset is not suited for processing the input image P; for example, when the processing instruction dataset includes trimming as the processing details, an overlapping ratio of the input image P and a trimming region Q is calculated as the degree-of-invalidity.

Figure 3B:
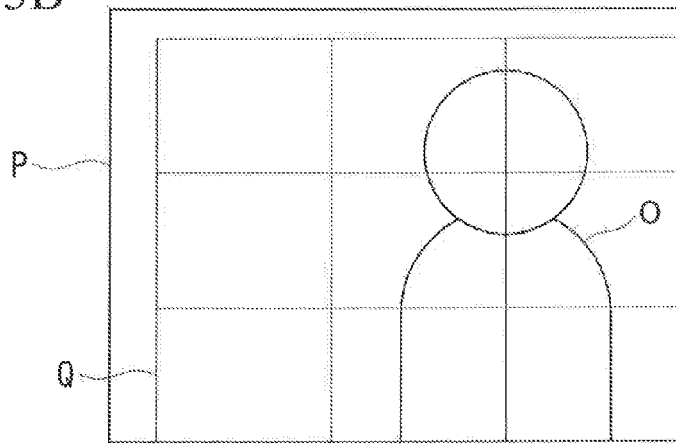
FIG. 3B is a diagram showing a trimming region set in the input image in FIG. 3A.
Figure 3C:
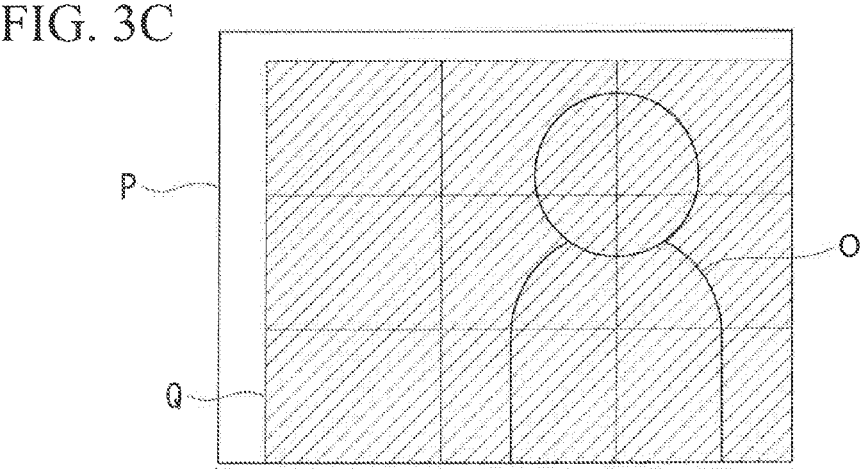
FIG. 3C is a diagram showing an overlapping region of the input image and the trimming region.

For the input image P in FIG. 3A, if the processing instruction dataset for processing instruction ID=4 is used, the processing details are target subject O position: intersection position of rule-of-thirds lines, aspect ratio: 4:3, and zoom factor: "as large as possible". In this case, the trimming region Q is set as shown in FIG. 3B. Thus, as shown in FIG. 3C, the ratio of the area of the trimming region (hatched part) Q to the area of the input image P is calculated as the overlapping ratio.

In other words, the larger the overlapping ratio is, the smaller the change in the image before and after the trimming processing is; and the smaller the overlapping ratio is, the larger the change in the image before and after the trimming processing is. If the post-processing image obtained by subjecting the input image P to trimming does not change relative to the input image P, the user, when looking at the images before and after processing, cannot recognize the effect of the trimming. Therefore, in such a case, the degree-of-invalidity of this processing instruction dataset is made high, so that the dataset is made difficult to select.

The output data control circuit 9 repeats the task of selecting the processing instruction datasets with the processing instruction dataset determining circuit 7 until the preset number of processing instruction datasets to be output has been selected.

Using the prescribed number of selected processing instruction datasets, the image processing circuit 8 subjects the input image P to the processing corresponding to the processing details included in each of the processing instruction datasets. By doing so, a prescribed number of image-processed images are created.

An image processing method using the thus-configured image processing apparatus 1 according to this embodiment will be described below.

Figure 4:
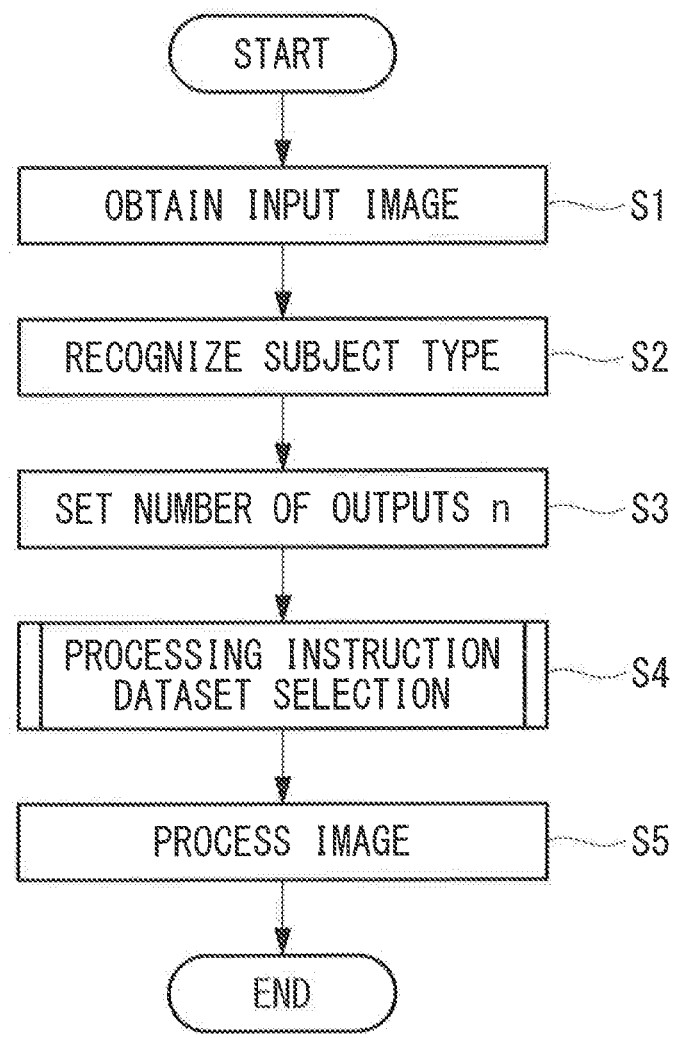
FIG. 4 is a flowchart showing an image processing method according to the embodiment of the present invention.

As shown in FIG. 4, the image processing method according to this embodiment includes a step S1 in which the input image P is obtained, a step (subject recognition step) S2 in which the subject type existing in the obtained input image P is recognized, a step S3 in which a number of outputs n is set, a step (processing instruction dataset determining step) S4 in which n processing instruction datasets are selected, and a step (image processing step) S5 in which the input image P is subjected to processing using the selected plurality of processing instruction datasets.

In step S1, one input image P is input to the image input circuit 2. In step S2, the target subject O in the input image P is recognized by the subject recognition circuit 5, and the target subject type is detected. In step S3, the number of processing instruction datasets which the user wishes to output is set. The number of outputs n may be set by the user each time, or a value that is set in advance may be used.

Figure 5:
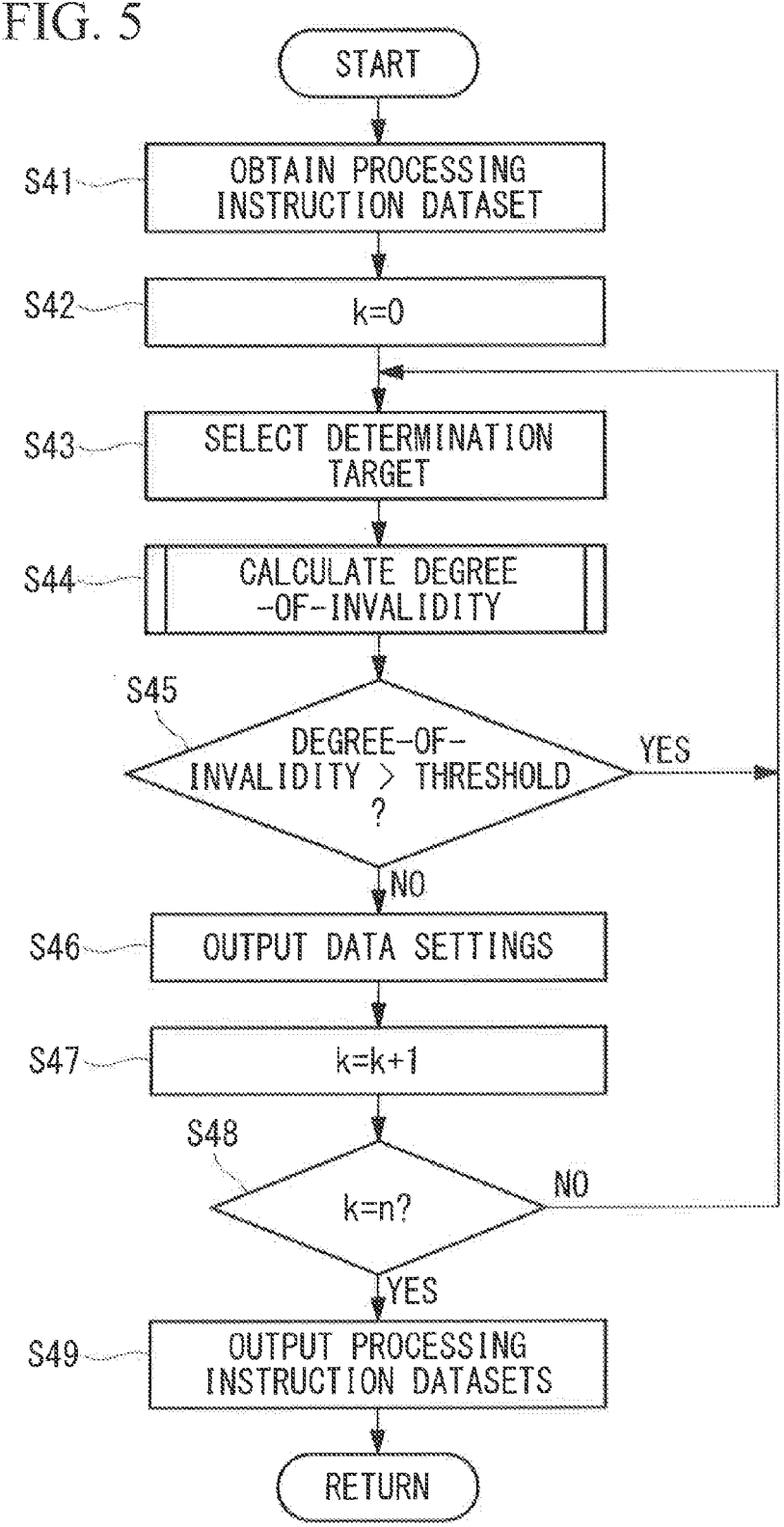
FIG. 5 is a flowchart showing the details of a processing instruction dataset selection routine in the flowchart in FIG. 4.

As shown in FIG. 5, step S4 includes a step (processing instruction dataset obtaining step) S41 in which a plurality of processing instruction datasets that are stored in the storage circuit 3 are obtained on the basis of the recognized subject type, a step S42 in which a counter k is reset, a step S43 in which one processing instruction dataset is selected as a determination target from among the obtained processing instruction datasets, a step S44 in which a degree-of-invalidity is calculated for the processing instruction dataset selected as the determination target, and a step S45 in which it is determined whether or not that processing instruction dataset is invalid, on the basis of the calculated degree-of-invalidity. In addition, a processing instruction dataset that is determined not to be invalid is set as a processing instruction dataset to be output (step S46).

In step S41, processing instruction datasets of a prescribed number which exceeds the set output number n are obtained in increasing order of their processing instruction IDs. For example, when the number of outputs is n, an invalid count is estimated, and n+α processing instruction datasets are obtained.

In addition, in step S4 in which the processing instruction datasets are selected, when a processing instruction dataset that is not invalid is selected as the processing instruction dataset to be output, step S4 also includes a step S47 in which the counter k is incremented, a step S48 in which it is determined whether the counter k has reached the set number of outputs n, and a step S49 in which, when it is determined that the counter k has reached the number of outputs n, a set prescribed number of processing instruction datasets are output.

Figure 6:
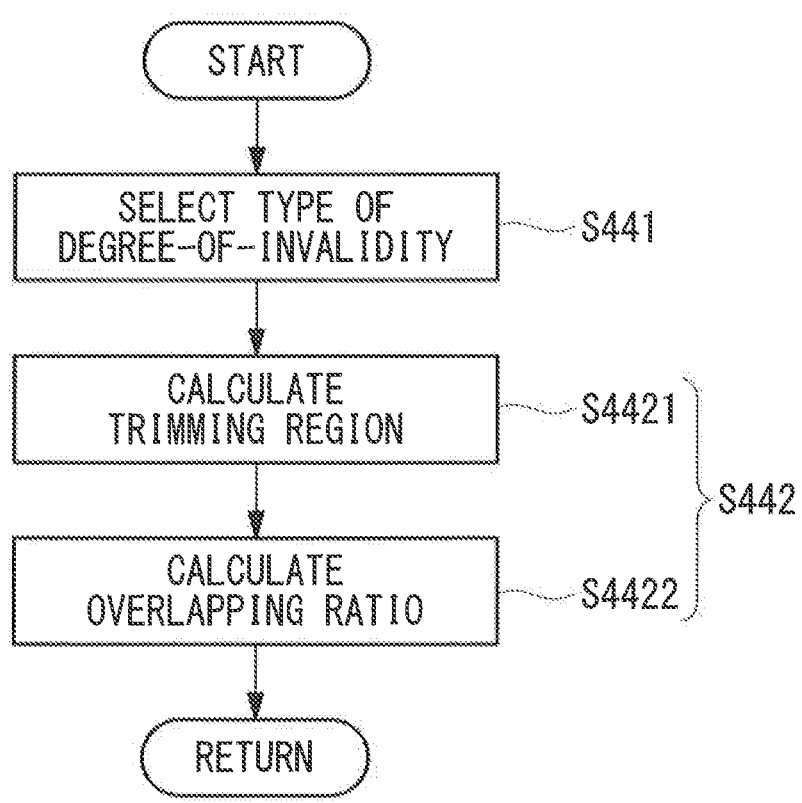
FIG. 6 is a flowchart showing the details of a degree-of-invalidity calculation routine in the flowchart in FIG. 5.

As shown in FIG. 6, step S44 includes a step S441 in which, on the basis of the processing instruction dataset selected as the determination target, a degree-of-invalidity type suitable for determining that processing instruction dataset, according to that processing instruction dataset, is selected, and a step S442 in which the degree-of-invalidity of the selected type is calculated for the processing instruction dataset. The processing instruction dataset and the type of the degree-of-invalidity may be stored in the processing instruction dataset determining circuit 7 in such a manner as to be associated with each other, or they may be stored in the storage circuit 3 and read out. The method of calculating the degree-of-invalidity of each type is associated with each type of degree-of-invalidity.

When trimming is included as the processing details in the processing instruction dataset, as shown in FIG. 6, step S442 includes a step S4421 in which the trimming region Q is calculated according to the trimming instruction details, and a step S4422 in which the overlapping ratio of the trimming region Q relative to the input image P is calculated.

With the thus-configured image processing apparatus 1 and the image processing method according to this embodiment, when the processing instruction dataset obtaining circuit 6 obtains the processing instruction dataset that is stored in the storage circuit 3, a plurality of processing instruction datasets that are stored according to the target subject type are obtained, and thereby, processing instruction datasets that are suitable for the type of the subject O are selected. Then, the processing instruction dataset determining circuit 7 selects processing instruction datasets having a low degree-of-invalidity according to the input image P, and thereby, processing instruction datasets that are suitable also for the input image P are selected.

In other words, with the image processing apparatus 1 and the image processing method according to this embodiment, simply by the user inputting the input image P, a plurality of processing instruction datasets that are suited to the type of subject O existing in the input image P and that are also suited to the input image P are selected and are offered in a form in which the input image P is processed using the selected plurality of processing instruction datasets. Therefore, an advantage is afforded in that, even if the user is not familiar with the processing details or does not know of the existence of such processing, by looking at the obtained image, he or she can see the effects of the processing and can notice the effectiveness of such processing, which should promote the use of such processing.

The image processing apparatus 1 of this embodiment may include a display circuit (not illustrated) that displays at least one of the plurality of processing instruction datasets selected in the processing instruction dataset determining circuit 7 and the image processed in the image processing circuit 8.

In this case, because at least one of the image processed by the image processing circuit 8 and the processing instruction datasets used for that processing is displayed on the display circuit, it is possible to confirm the processing details used or the effect of that processing. Because processing instruction datasets for processing details that are suitable for both the subject type and the input image P are selected as the processing instruction dataset, it is possible for the user to recognize the correct effect of the processing by means of an image in which the true effect of that processing appears.

Moreover, in this embodiment, although the overlapping ratio of the trimming region Q relative to the input image P is used as the degree-of-invalidity, a value obtained by multiplying the overlapping ratio by an arbitrary factor may be used as the degree-of-invalidity, or the degree-of-invalidity may be obtained by converting the overlapping ratio based on a conversion table. In addition, a function other than the overlapping ratio may be used as the degree-of-invalidity so long as it is a function that decreases as the change in the image after processing the input image P increases.

In addition, for the selected processing instruction data, although it has been assumed that the degree-of-invalidity for trimming processing included in that processing instruction dataset is calculated, instead of this, a degree-of-invalidity for each of a plurality of processing details included in the selected processing instruction dataset may be calculated, and the invalidity determination may be performed using a degree-of-invalidity in which these are combined. As the method of combining the plurality of degrees-of-invalidity, a method such as weighted addition of the individual degrees-of-invalidity could be used.

In addition, in this embodiment, the case in which the processing details for the processing instruction dataset include trimming has been described. Instead of this, it is also possible to apply color information or tone information of the filter results, etc. to the processing details.

In this case, the reciprocal of the variation in pixel values before and after processing should be calculated as the degree-of-invalidity.

When the processing instruction dataset includes processing details in which a change is given to the color information or tone information, to calculate the degree-of-invalidity, the input image P is subjected to tentative processing for determining the degree-of-invalidity. For example, simple processing is performed by means of an image etc. obtained by reducing the size of the input image P.

Then, at each pixel in the input image P, the reciprocal of the variation in pixel values between the input image P and the image after simple processing is calculated. The variation in the pixel values is, for example, the difference. By doing so, it is possible to employ a degree-of-invalidity that increases as the change in the image before and after processing decreases.

Furthermore, when the processing instruction dataset includes processing details that give a change to the color information or the tone information, in some cases the processing details can be defined with a photographic parameter such as the white-balance setting. In that case, it is possible to use the reciprocal of the variation in the photographic parameter of the input image P itself as the degree-of-invalidity. In other words, it is possible to calculate the change in the image before and after processing without analyzing the pixel values of the image.

For example, by defining the degree-of-invalidity as the reciprocal of the difference between the color temperature value due to the white-balance setting in the processing details and the color temperature value for the white balance setting of the input image P, it is possible to use a degree-of-invalidity that increases as the change in the image before and after processing decreases.

In this way, the processing details in the processing instruction dataset in the present invention may be photographic parameters or development parameters.

Moreover, when the processing instruction dataset includes processing details for blur processing, the reciprocal of the variation between the degree of blur intended by the processing details for blur processing and the degree of blur of the input image P is defined as the degree-of-invalidity. By doing so, it is possible to employ a degree-of-invalidity that increases as the change in the image before and after processing decreases.

The degree of blur can be calculated using a blur evaluation function such as frequency analysis of a region in the image and quantifying the amount of low-frequency components relative to high-frequency components.

If the processing instruction dataset includes processing details for keystone correction processing, by means of the keystone correction processing, straight edge portions which exist in the subject O in the input image P are corrected so as to be coincident with vertical lines on the image. Therefore, in this case, because the effect of keystone correction processing becomes more pronounced as the inclination angle of straight edge portions in the input image P relative to the vertical lines on the image increases, the reciprocal of the inclination angle in the input image P or the reciprocal of the variation in the above angle in the image before and after the processing performed on the input image P is employed as the degree-of-invalidity, thereby making it possible to employ a degree-of-invalidity that increases as the change in the image before and after processing decreases.

In addition, if the processing instruction dataset includes processing details for applying an optical distortion effect, because it becomes difficult to determine the effect of applying an optical distortion as the optical distortion in the input image P increases, by employing the level of optical distortion in the input image P as the degree-of-invalidity, it is possible to employ a degree-of-invalidity that increases as the change in the image before and after processing decreases.

In addition, in this embodiment, although a function that is considered to increase as the change in the image before and after processing decreases is mostly used, instead of this, it is also permissible to employ a function that exhibits a difference (intended difference) between an estimated image (intended image) R that is estimated to be obtained by processing the input image P based on the processing instruction dataset and an image obtained by subjecting the input image P to processing based on the processing instruction dataset.

Figure 7A:
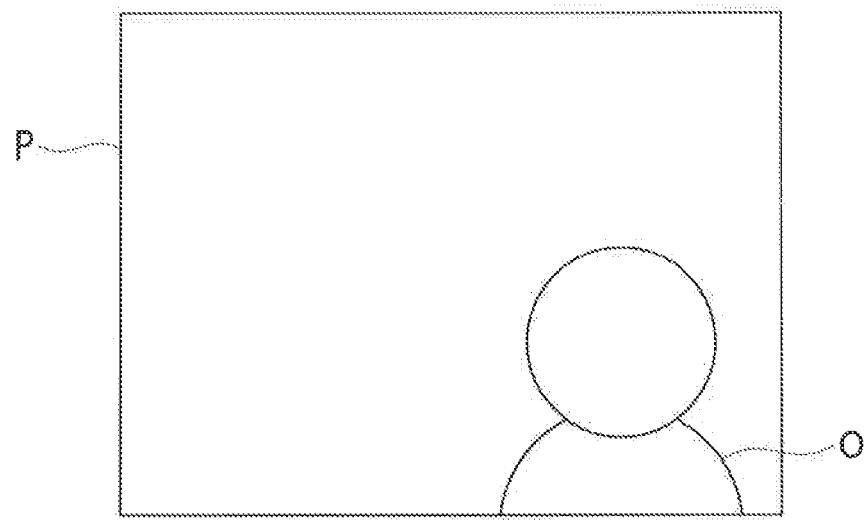
FIG. 7A is a diagram showing an example of an input image.
Figure 7B:
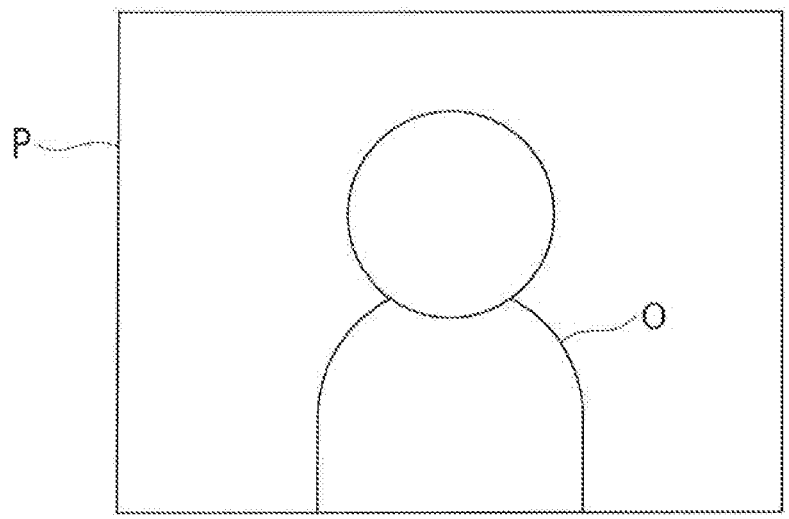
FIG. 7B is a diagram showing an example of an estimated image.
Figure 7C:
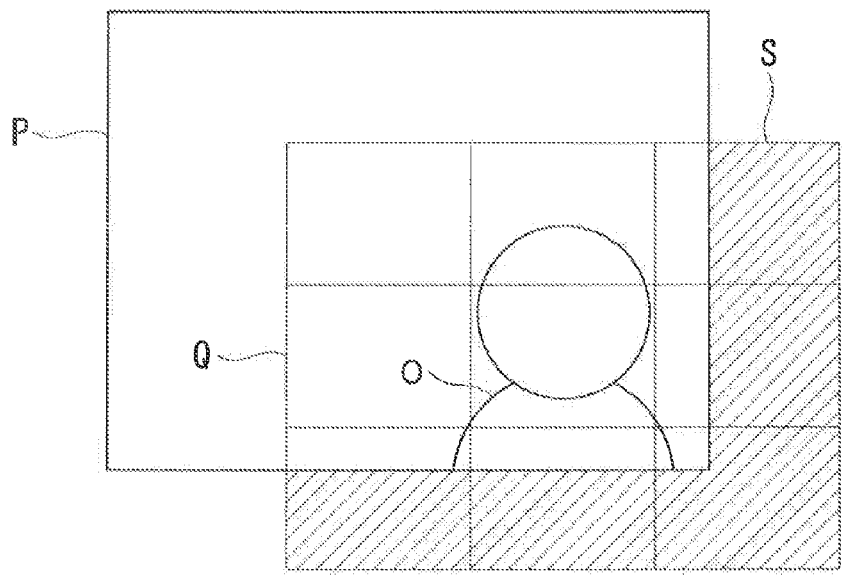
FIG. 7C is a diagram showing a protruding region of the trimming region.

For example, if the processing details in the processing instruction dataset include trimming, the size of a protruding region S of the trimming region Q that protrudes from the input image P, which is set based on the processing instruction dataset, could be defined as the degree-of-invalidity. In other words, as shown in FIG. 7A, for an input image P in which a person serving as the subject O is located so as to be offset towards the periphery, when the parameter for the position of the target subject O is "center position", the intended image R is considered to be the one shown in FIG. 7B; however, as shown in FIG. 7C, depending on the offset direction of the subject O, the aspect ratio, the zoom factor etc., the trimming region Q is defined as the protruding position from the input image P. As the size of this protruding region (hatched portion) S, the image after processing shifts from the estimated image R, and the intended difference increases; therefore, it is possible to make the degree-of-invalidity higher.

Figure 8:
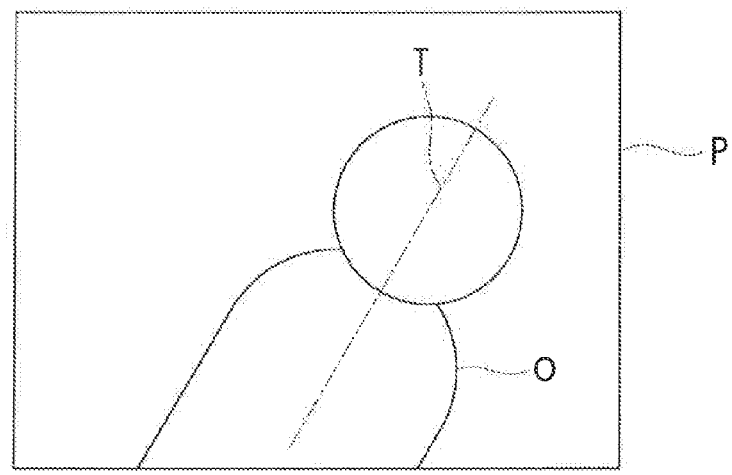
FIG. 8 is a diagram showing an example of an input image in which a reference axis of the subject is tilted.

When the processing details in the processing instruction dataset include rotation processing, the inclination angle of a reference axis T of the subject O in the input image P could be defined as the degree-of-invalidity. In other words, as shown in FIG. 8, if the reference axis T of a person serving as the subject O is inclined from the beginning, when a rotation process is performed in the same direction as that inclination direction, the subject O becomes inclined more than the intended image, whereas when a rotation process is performed in the opposite direction, the inclination of the subject O becomes smaller than that of the intended image, and in either case, since the intended difference becomes large, it is possible to make the degree-of-invalidity higher.

More specifically, the processing instruction dataset determining circuit 7 analyses the input image P according to the processing details for the processing instruction data, and determines whether the inclination angle of the reference axis T of the subject O in the input image P is larger than a prescribed threshold. When the inclination angle of the reference axis T is large, the degree-of-invalidity is high, and therefore, it becomes easier to determine that that processing instruction dataset is invalid.

In addition, if the processing details for the processing instruction dataset include at least one of color information processing and tone information processing, the degree-of-invalidity should be set based on the pixel values of the subject O in the input image P.

For example, in the case of processing details for applying a minus correction value to the exposure, if the input image P is already underexposed, an image that is darker than the intended image would be created, and therefore, the intended difference would be large. In other words, in this case, if the pixel value is small, the degree-of-invalidity is high, and therefore, the reciprocal of the pixel value should be set as the degree-of-invalidity.

More specifically, the processing instruction dataset determining circuit 7 analyses the input image P according to the processing details for the processing instruction dataset and determines whether the pixel values of the subject O in the input image P are larger than a prescribed threshold. In the case of processing details for applying a minus correction value to the exposure, if the pixel values are small, the degree-of-invalidity is high, and therefore, it is becomes easier to determine that that processing instruction dataset is invalid.

In addition, for example, in the case of processing details for leaving a red color in the input image P and making the other colors gray, if no red exists in the input image P, the image would be entirely gray, and therefore, an image that differs from the intended image would be produced. In this case, by setting the reciprocal of the ratio of all pixels having high red pixel values in the image as the degree-of-invalidity, a processing instruction dataset that creates an unintended image can be determined as being invalid and can be excluded.

In addition, in this embodiment, for processing instruction datasets whose degrees-of-invalidity have been determined as being higher than the prescribed threshold and which have been excluded from the selection, the processing instruction dataset determining circuit 7 may count the number of exclusions and store this number in the storage circuit 3, and the processing instruction dataset obtaining circuit 6 may obtain processing instruction datasets having a high number of exclusions with priority.

In other words, for example, as shown in FIG. 9, the storage circuit 3 stores, in association with each processing instruction ID, a total invalid number (number of exclusions) serving as the degree-of-invalidity data for the processing instruction dataset corresponding to that processing instruction ID. FIG. 9 shows an example in which, in addition to the total invalid number, a continuous invalid number and a degree-of-invalidity are also stored.

The total invalid number is the total number of times that the processing instruction dataset was determined to be invalid previously, the continuous invalid number is the number of times that the processing instruction dataset was continuously determined to be invalid after it was last determined not to be invalid, and the degree-of-invalidity is the degree-of-invalidity that is finally calculated.

Figure 10:
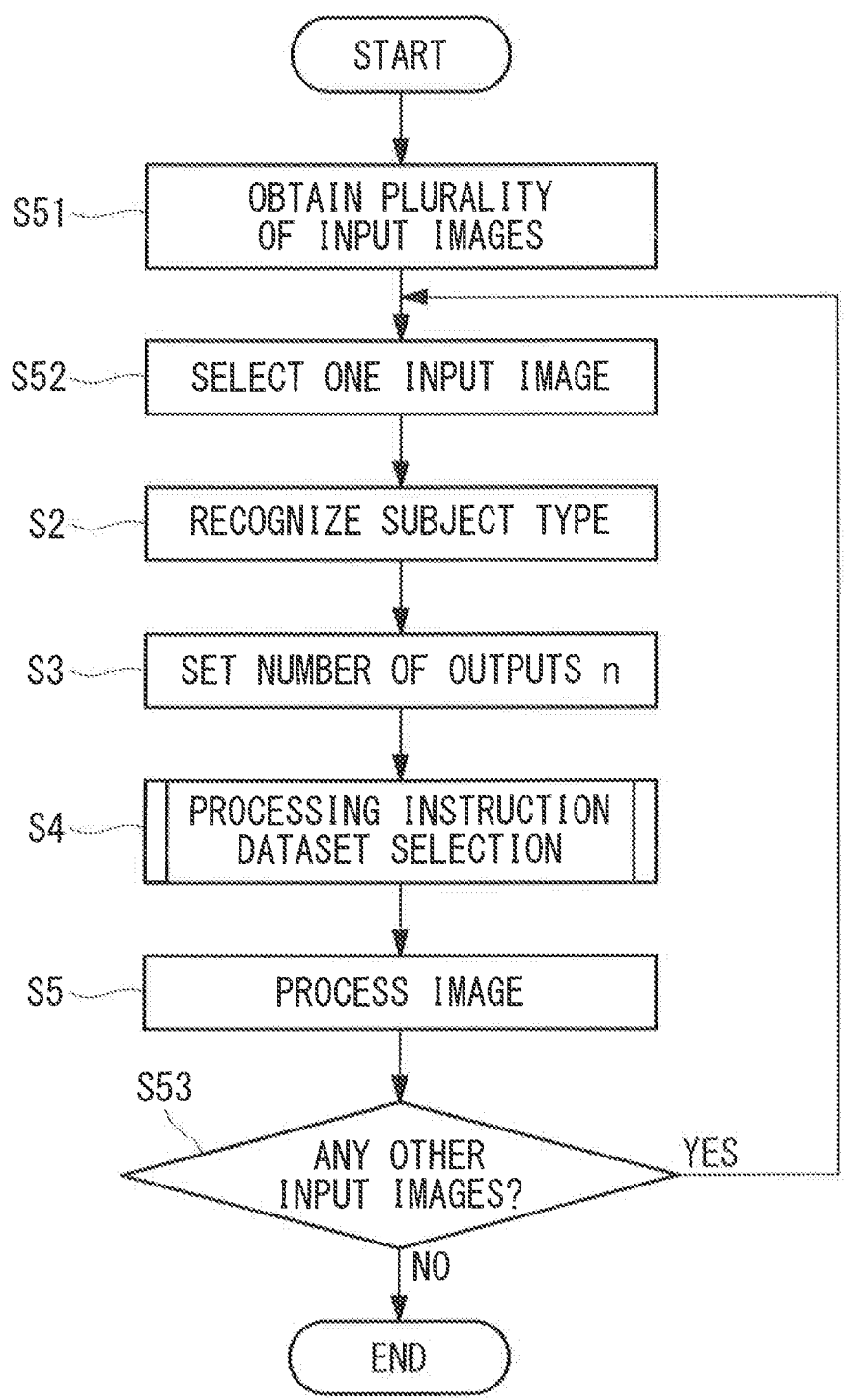
FIG. 10 is a flowchart showing a modification of the image processing method in FIG. 4.

Then, as shown in FIG. 10, when a plurality of input images P are input to the image input circuit 2 (step S51), one of the input images P is selected (step S52), and the processes in the above-described steps S2 to S5 are performed until processing of all of the input images P that have been input is completed (step S53). As shown in FIG. 11, in the processing instruction dataset determining circuit 7, the degree-of-invalidity data stored in association with the plurality of processing instruction datasets obtained by the processing instruction dataset obtaining circuit 6 are referred to, and a processing instruction dataset having a high total invalid number is set as the determination target with priority (step S61).

Then, if, as a result of the invalidity determination, the processing instruction dataset is determined as being invalid, the total invalid number etc. in the degree-of-invalidity data for that processing instruction dataset is updated (step S62), and determination processing is performed on the next processing instruction data. The number of acquisitions of the processing instruction dataset obtained by the processing instruction dataset obtaining circuit 6 is higher than the number of outputs of the processing instruction datasets that are finally output, and therefore, once the output number is reached, determination of all of the obtained processing instruction datasets is not performed.

Therefore, by doing so, since the processing instruction dataset which is determined as being invalid and is thus excluded a large number of times serves as the determination target with priority, the opportunities for determination increase, and it is thus possible to easily select it in the processing instruction dataset determining circuit 7. As a result, it is possible to prevent a processing instruction dataset that is often determined as not being invalid from being buried without being used.

In addition, although FIG. 9 shows an example in which degree-of-invalidity data is stored for each processing instruction ID, in addition to this, an invalid count for each type of processing details in the processing instruction dataset may be stored. For example, in the case where a certain processing instruction dataset is determined as being invalid, if a filter (Filter) is included in the processing details in that processing instruction dataset, the invalid count of the filter (Filter) A is increased and stored. Then, in the determination, the processing instruction dataset determining circuit 7 may use not only the degree-of-invalidity data for the processing instruction IDs, but also each invalid count for the processing details associated with the respective processing instruction IDs.

Moreover, history data for the degree-of-invalidity may be stored, as shown in FIG. 12.

In FIG. 12, "determination order" is stored in order of the newest to oldest. "Timestamp" is the date and time at which the processing instruction ID was determined, "input image name" is the file name of the input image P (or identification information for specifying the file), and "accumulated number of input images" is a count of the number of accumulated input images P.

In the case where such data is stored, when n processing instruction datasets are stored, the output data control circuit 9 should output, with priority, a processing instruction ID having a long duration from when it was last determined as not being invalid.

Also, in this embodiment, although processing by hardware has been assumed for the processing which the image processing apparatus 1 performs, it is not limited thereto, and for example, processing by software is also possible. In this case, the image processing apparatus 1 should include a CPU that performs processing and a main storage device such as a RAM, and should include a computer-readable recording medium in which a program for causing the CPU to execute all or some of the above processing is stored. Here, this program is referred to as an image processing program. Then, the CPU reads out the image processing program stored in the recording medium and executes information processing and computational processing, thereby realizing processing identical to that of the above-described image processing apparatus 1.

Here, the computer-readable recording medium means a magnetic disk, a magneto-optic disk, a CD-ROM, and DVD-ROM, a semiconductor memory or the like. Also, this image processing program may be transmitted to a computer via a communication line, and upon receiving this transmission, the computer may execute the corresponding image processing program.

The various circuits in this embodiment, besides being configured so as to be implemented in the form of a single chip, may be configured so as to be implemented in a divided manner on a wiring board.

The above embodiment is derived from each of the aspects of the present invention described below.

One aspect of the present invention is an image processing apparatus including a subject recognition circuit that recognizes a subject type existing in an input image; a storage circuit that stores a plurality of processing instruction datasets that represent processing details for processing the input image; a processing instruction dataset obtaining circuit that obtains, from the storage circuit, the processing instruction datasets which are predefined according to the subject type recognized by the subject recognition circuit; a processing instruction dataset determining circuit that calculates, for each of the processing instruction datasets obtained by the processing instruction dataset obtaining circuit, a degree-of-invalidity indicating a degree to which the processing instruction dataset is not suitable for the input image and that selects a prescribed number of the processing instruction datasets for which the degrees-of-invalidity are less than or equal to a prescribed threshold; and an image processing circuit that performs processing of the input image using the prescribed number of processing instruction datasets selected in the processing instruction dataset determining circuit.

With this aspect, when an input image is input, the subject type that exists in the input image is recognized in the subject recognition circuit, and the processing instruction dataset obtaining circuit obtains a plurality of processing instruction datasets that are stored in the storage circuit on the basis of the recognized subject type. Then, the processing instruction dataset determining circuit calculates a degree-of-invalidity for each of the obtained processing instruction datasets, and processing instruction datasets whose degrees-of-invalidity are high are determined as being invalid and are excluded from the selection target.

Even for processing instruction datasets that are predefined as being suitable for the subject type that exists in the input image, there are some cases where they are not suitable for an actual input image, and in the processing instruction dataset determining circuit, a degree-of-invalidity indicating such a degree of unsuitability is calculated, and a prescribed number of processing instruction datasets having degrees-of-invalidity less than or equal to a prescribed threshold are selected.

Then, by processing the input image in the image processing circuit using the prescribed number of selected processing instruction datasets, a prescribed number of images on which processing suitable for the subject type and also for the input image is performed are created.

In other words, with this aspect, even in the case where the user does not know about the processing details or their usage method, it is possible to confirm the effects of that processing, and it is thus possible to make the user aware of the existence of such processing and the effects thereof. Therefore, the number of unused image processing functions among a large number of built-in image processing functions can be reduced, and use of the available image processing functions can be encouraged.

In the above aspect, the processing instruction dataset determining circuit may store degree-of-invalidity types suitable for the determination of the processing instruction datasets, according to each of the processing instruction datasets, and may calculate a degree-of-invalidity for the selected type, for each of the processing instruction datasets to be determined.

By doing so, rather than using the same type of degree-of-invalidity for determining the invalidity of different processing instruction datasets, degrees-of-invalidity that are suitable for the processing instruction datasets are selected and calculated; therefore, it is possible to select, with high precision, a processing instruction dataset that is suitable for the input image.

The above aspect may further include a display circuit that displays at least one of the plurality of sets of processing instruction dataset selected in the processing instruction dataset determining circuit and an image processed in the image processing circuit.

By doing so, since at least one of the processed image and the processing instruction dataset used in that processing is displayed, it is possible to confirm the processing details used or the effect of that processing. As for the processing instruction datasets, since those having processing details that are suitable for both the subject type and the input image are selected, it is possible to allow the user to recognize the correct effect of the processing by using an image in which the true effect of that processing appears.

In the above aspect, the degree-of-invalidity is defined as a function that decreases as a change in the image before and after processing performed on the input image on the basis of the processing instruction datasets increases.

By doing so, in the case where the change in the image before and after the processing performed on the input image is large, since the input image changes by a large amount due to the processing, it is treated as an image in which the effect of the processing appears more pronounced, causing the degree-of-invalidity to decrease, and thus making selection easier. In addition, in the case where the change in the image before and after the processing performed on the input image is small, the image after processing does not change much relative to the input image, and therefore, it is treated as an image in which the effect of the processing does not appear much, causing the degree-of-invalidity to become high, and thus making selection more difficult.

In the above aspect, the processing details for the processing instruction dataset determined by the processing instruction dataset determining circuit may include trimming, and the degree-of-invalidity may be an overlapping ratio between a trimming region, which is set on the basis of the processing instruction dataset, and the input image.

By doing so, in the trimming for cutting out a prescribed area from the input image, as the overlapping ratio of the trimming region and the input image increases, the change in the trimmed image relative to the input image due to the trimming becomes smaller. Therefore, by directly defining the overlapping ratio as the degree-of-invalidity, processing instruction datasets with which the change in the image before and after processing is small can be made more difficult to select.

In the above aspect, the processing details for the processing instruction dataset determined by the processing instruction dataset determining circuit may include at least one of processing of color information and processing of tone information, and the degree-of-invalidity may be the reciprocal of a variation in pixel values in the image before and after processing performed on the input image on the basis of the processing instruction dataset.

By doing so, when color information or tone information in the input image is processed, as the pixel values before and after processing vary more, the change in the image becomes larger, and therefore, by defining the reciprocal of the variation in pixel values as the degree-of-invalidity, processing instruction datasets with which the change in the image before and after processing is large can be made more difficult to select.

In the above aspect, the processing details for the processing instruction dataset determined by the processing instruction dataset determining circuit may include blur processing, and the degree-of-invalidity may be the reciprocal of a variation in a degree-of-blur in the image before and after the processing performed on the input image on the basis of the processing instruction dataset.

By doing so, when blur processing is performed on the input image, as the degree-of-blur before and after processing varies more, the change in the image becomes greater, and therefore, by defining the reciprocal of the variation in the degree-of-blur as the degree-of-invalidity, processing instruction datasets with which the change in the image before and after processing is small can be made more difficult to select.

In the above aspect, the processing details for the processing instruction dataset determined by the processing instruction dataset determining circuit may include keystone correction processing, and the degree-of-invalidity may be the reciprocal of a variation in an angle, relative to a vertical line, of a straight edge portion in the image before and after processing performed on the input image on the basis of the processing instruction dataset.

In the case where the input image is subjected to keystone correction processing, the angle of straight edge portions in the input image relative to a vertical line approach zero. Therefore, by defining the reciprocal of the variation in the angle of a straight edge portion, relative to a vertical line, in the image before and after processing as the degree-of-invalidity, for processing of an input image in which the angle of a straight edge portion relative to a vertical line is large, a large effect can be obtained, and a processing instruction dataset for keystone correction processing can be made easy to select.

In the above aspect, the processing details for the processing instruction dataset determined by the processing instruction dataset determining circuit may include processing for applying an optical distortion effect, and the degree-of-invalidity may be an amount of optical distortion in the input image.

By doing so, in the case of an input image in which the optical distortion is large, the effect is not noticeable even when performing processing for applying optical distortion, and therefore, the degree-of-invalidity becomes higher as the optical distortion in the input image becomes greater, and it is possible to make the selection thereof more difficult.

In the above aspect, the degree-of-invalidity may be a difference between an estimated image that is estimated to be obtained by processing of the input image on the basis of the processing instruction dataset and an image obtained by subjecting the input image to processing on the basis of the processing instruction dataset.

By doing so, the degree-of-invalidity becomes higher as the difference between the estimated image and the processed image becomes greater, and the selection can be made more difficult. Since the estimated image is an image obtained by processing on the basis of the processing instruction dataset and in which the effect thereof appears more pronounced, as the difference between the estimated image and the processed image becomes smaller, the selection is preferably made more easy.

In the above aspect, the processing details for the processing instruction dataset determined by the processing instruction dataset determining circuit may include trimming, and the degree-of-invalidity may be a size of a protruding region that protrudes from the input image, in a trimming region set on the basis of the processing instruction data.

By doing so, when the trimming region set on the basis of the processing instruction dataset that includes trimming protrudes from the input image, a processed image differing from an estimated image which is assumed not to protrude is obtained, and therefore, such a processing instruction dataset has a high degree-of-invalidity, and can be made more difficult to select.

In the above aspect, the processing details for the processing instruction dataset determined by the processing instruction dataset determining circuit may include rotation processing, and the degree-of-invalidity may be an inclination angle of a reference axis of the subject in the input image.

By doing so, when the reference axis of the subject is rotated so as to become the prescribed angle by rotation processing on the basis of the processing instruction dataset that includes rotation processing, if the reference axis of the subject in the input image is already inclined, because it is rotated by an even greater amount, a processed image that differs from the estimated image is obtained. Therefore, such processing instruction datasets result in a large inclination angle of the reference axis in the input image, and thus a large degree-of-invalidity, and can be made more difficult to select.

In the above aspect, the processing details of the processing instruction dataset determined by the processing instruction dataset determining circuit may include at least one of processing of color information and processing of tone information, and the degree-of-invalidity may be set on the basis of a pixel value of the subject in the input image.

By doing so, when the input image is subjected to processing of color information or tone information, if the pixel values of the subject in the input image already include pixel values with a tendency to be changed by the processing, the pixel values will be changed by more than the estimated amount by the processing, and therefore, in such a case, the degree-of-invalidity is higher, and the processing instruction dataset can be made more difficult to select.

For example, when the processing instruction dataset includes processing details for applying a minus correction value to the exposure, if the subject in the input image is already underexposed, an excessively underexposed image would be obtained, and therefore, the difference from the estimated image will be large, and the degree-of-invalidity can be made higher.

In the above aspect, the processing instruction dataset determining circuit may count a number of exclusions for the processing instruction datasets that are excluded from the selection upon determining that the degrees-of-invalidity are higher than a prescribed threshold, store these processing instruction datasets in the storage circuit, and set a stored processing instruction dataset having a high number of exclusions as a determination target with priority.

By doing so, a processing instruction dataset having a high degree-of-invalidity and excluded no matter how many times is set as the determination target with priority, and the opportunities for serving as the determination target in the processing instruction dataset determining circuit increase, and thus, the selection thereof can be made more easy.

Another aspect of the present invention is an image processing method including a subject recognition step of recognizing a subject type existing in an input image; a processing instruction dataset obtaining step of obtaining, from among a plurality of processing instruction datasets that represent processing details for processing the input image, the processing instruction datasets which are predefined according to the subject type recognized in the subject recognition step; a processing instruction dataset determining step of calculating, for each of the processing instruction datasets obtained in the processing instruction dataset obtaining step, a degree-of-invalidity indicating a degree to which the processing instruction dataset is not suitable for the input image, and of selecting a prescribed number of the processing instruction datasets for which the degrees-of-invalidity are less than or equal to a prescribed threshold; and an image processing step of performing processing of the input image using the prescribed number of processing instruction datasets selected in the processing instruction dataset determining step.

Another aspect of the present invention is an image processing program that causes a computer to execute a subject recognition step of recognizing a subject type existing in an input image; a processing instruction dataset obtaining step of obtaining, from among a plurality of processing instruction datasets that represent processing details for processing the input image, the processing instruction datasets which are predefined according to the subject type recognized in the subject recognition step; a processing instruction dataset determining step of calculating, for each of the processing instruction datasets obtained in the processing instruction dataset obtaining step, a degree-of-invalidity indicating a degree to which the processing instruction dataset is not suitable for the input image, and of selecting a prescribed number of the processing instruction datasets for which the degrees-of-invalidity are less than or equal to a prescribed threshold; and an image processing step of performing processing of the input image using the prescribed number of processing instruction datasets selected in the processing instruction dataset determining step.

Another aspect of the present invention is a computer-readable recording medium that stores a program that causes a computer to execute a subject recognition step of recognizing a subject type existing in an input image; a processing instruction dataset obtaining step of obtaining, from among a plurality of processing instruction datasets that represent processing details for processing the input image, the processing instruction datasets which are predefined according to the subject type recognized in the subject recognition step; a processing instruction dataset determining step of calculating, for each of the processing instruction datasets obtained in the processing instruction dataset obtaining step, a degree-of-invalidity indicating a degree to which the processing instruction dataset is not suitable for the input image, and of selecting a prescribed number of the processing instruction datasets for which the degrees-of-invalidity are less than or equal to a prescribed threshold; and an image processing step of performing processing of the input image using the prescribed number of processing instruction datasets selected in the processing instruction dataset determining step.

REFERENCE SIGNS LIST 1 image processing apparatus
3 storage circuit
5 subject recognition circuit
6 processing instruction dataset obtaining circuit
7 processing instruction dataset determining circuit
8 image processing circuit
S2 subject recognition step
S4 processing instruction dataset determining step
S5 image processing step
S41 processing instruction dataset obtaining step
O subject
P input image
Q trimming region
R estimated image
S protruding region

The invention claimed is:

1. An image processing apparatus comprising:
 a subject recognition circuit that recognizes a subject type existing in an input image;
 a storage circuit that stores a plurality of processing instruction datasets that represent processing details for processing the input image;
 a processing instruction dataset obtaining circuit that obtains, from the storage circuit, the processing instruction datasets which are predefined according to the subject type recognized by the subject recognition circuit;
 a processing instruction dataset determining circuit that calculates, for each of the processing instruction datasets obtained by the processing instruction dataset obtaining circuit, a degree-of-invalidity indicating a degree to which the processing instruction dataset is not suitable for the input image and that selects a prescribed number of the processing instruction datasets for which the degrees-of-invalidity are less than or equal to a prescribed threshold; and
 an image processing circuit that performs processing of the input image using the prescribed number of the processing instruction datasets selected by the processing instruction dataset determining circuit;
 wherein the processing instruction dataset determining circuit stores degree-of-invalidity types suitable for determination of the processing instruction datasets, according to each of the processing instruction datasets, and calculates a degree-of-invalidity for a selected type, for each of the processing instruction datasets to be determined, and
 wherein the degree-of-invalidity is defined as a function that decreases as a change in the input image before and after processing performed on the input image based on the processing instruction datasets increases.

2. The image processing apparatus according to claim 1, wherein the processing details for the processing instruction dataset determined by the processing instruction dataset determining circuit include trimming, and
 wherein the degree-of-invalidity is an overlapping ratio between a trimming region, which is set based on the processing instruction dataset, and the input image.

3. The image processing apparatus according to claim 1, wherein the processing details for the processing instruction dataset determined by the processing instruction dataset determining circuit include at least one of processing of color information and processing of tone information, and
 wherein the degree-of-invalidity is the reciprocal of a variation in pixel values in the input image before and after processing performed on the input image based on the processing instruction dataset.

4. The image processing apparatus according to claim 1, wherein the processing details for the processing instruction dataset determined by the processing instruction dataset determining circuit include blur processing, and
 wherein the degree-of-invalidity is the reciprocal of a variation in a degree-of-blur in the input image before and after the processing performed on the input image based on the processing instruction dataset.

5. The image processing apparatus according to claim 1, wherein the processing details for the processing instruction dataset determined by the processing instruction dataset determining circuit include keystone correction processing, and
 wherein the degree-of-invalidity is the reciprocal of a variation in an angle, relative to a vertical line, of a straight edge portion in the input image before and after processing performed on the input image based on the processing instruction dataset.

6. The image processing apparatus according to claim 1, wherein the processing details for the processing instruction dataset determined by the processing instruction dataset determining circuit include processing for applying an optical distortion effect, and
wherein the degree-of-invalidity is an amount of optical distortion in the input image.

7. The image processing apparatus according to claim 1, wherein the processing details for the processing instruction dataset determined by the processing instruction dataset determining circuit include at least one of processing of color information and processing of tone information, and
wherein the degree-of-invalidity is set based on a pixel value of the subject in the input image.

8. The image processing apparatus according to claim 1, wherein the processing instruction dataset determining circuit counts a number of exclusions for the processing instruction datasets that are excluded from the selection upon determining that the degrees-of-invalidity thereof are higher than a prescribed threshold, stores the excluded processing instruction datasets in the storage circuit, and sets a stored processing instruction dataset having a high number of exclusions as a determination target with priority.

9. An image processing apparatus comprising:
a subject recognition circuit that recognizes a subject type that exists in an input image;
a storage circuit that stores a plurality of processing instruction datasets that represent processing details for processing the input image;
a processing instruction dataset obtaining circuit that obtains, from the storage circuit, the processing instruction datasets which are predefined according to the subject type recognized by the subject recognition circuit;
a processing instruction dataset determining circuit that calculates, for each of the processing instruction datasets obtained by the processing instruction dataset obtaining circuit, a degree-of-invalidity indicating a degree to which the processing instruction dataset is not suitable for the input image and that selects a prescribed number of the processing instruction datasets for which the degrees-of-invalidity are less than or equal to a prescribed threshold; and
an image processing circuit that performs processing of the input image using the prescribed number of the processing instruction datasets selected by the processing instruction dataset determining circuit,
wherein the processing instruction dataset determining circuit stores types of degrees-of-invalidity suitable for determination of the processing instruction datasets, according to each of the processing instruction datasets, and calculates a degree-of-invalidity for a selected type, for each of the processing instruction datasets to be determined, and
wherein the degree-of-invalidity is a difference between an estimated image that is estimated to be obtained by processing of the input image based on the processing instruction dataset and an image obtained by subjecting the input image to processing based on the processing instruction dataset.

10. The image processing apparatus according to claim 9, wherein the processing details of the processing instruction dataset determined by the processing instruction dataset determining circuit include trimming, and
wherein the degree-of-invalidity is a size of a protruding region from the input image, in a trimming region set based on the processing instruction data.

11. The image processing apparatus according to claim 9, wherein the processing details of the processing instruction dataset determined by the processing instruction dataset determining circuit include rotation processing, and
wherein the degree-of-invalidity is an inclination angle of a reference axis of the subject in the input image.

12. The image processing apparatus according to claim 9, wherein the processing instruction dataset determining circuit counts a number of exclusions for the processing instruction datasets that are excluded from the selection by determining that the degrees-of-invalidity thereof are higher than a prescribed threshold, stores the excluded processing instruction datasets in the storage circuit, and sets a stored processing instruction dataset having a high number of exclusions as a determination target with priority.

13. An image processing method comprising:
a subject recognition step of recognizing a subject type existing in an input image;
a processing instruction dataset obtaining step of obtaining, from among a plurality of processing instruction datasets that represent processing details for processing the input image, the processing instruction datasets which are predefined according to the subject type recognized in the subject recognition step;
a processing instruction dataset determining step of calculating, for each of the processing instruction datasets obtained in the processing instruction dataset obtaining step, a degree-of-invalidity indicating a degree to which the processing instruction dataset is not suitable for the input image, and of selecting a prescribed number of the processing instruction datasets for which the degrees-of-invalidity are less than or equal to a prescribed threshold; and
an image processing step of performing processing of the input image using the prescribed number of the processing instruction datasets selected in the processing instruction dataset determining step;
wherein types of degrees-of-invalidity suitable for determination of the processing instruction datasets are stored according to each of the processing instruction datasets, and a degree-of-invalidity for a selected type is calculated, for each of the processing instruction datasets to be determined, and
wherein the degree-of-invalidity is defined as a function that decreases as a change in the input image before and after processing performed on the input image based on the processing instruction datasets increases.

14. A non-transitory computer-readable recording medium that stores a program that causes a computer to execute:
a subject recognition step of recognizing a subject type existing in an input image;
a processing instruction dataset obtaining step of obtaining, from among a plurality of processing instruction datasets that represent processing details for processing the input image, the processing instruction datasets which are predefined according to the subject type recognized in the subject recognition step;
a processing instruction dataset determining step of calculating, for each of the processing instruction datasets obtained in the processing instruction dataset obtaining step, a degree-of-invalidity indicating a degree to which the processing instruction dataset is not suitable for the input image and of selecting a prescribed number of the processing instruction datasets for which the degrees-of-invalidity are less than or equal to a prescribed threshold; and an image processing step of performing processing of the input image using the prescribed number of the processing instruction datasets selected in the processing instruction dataset determining step;

wherein types of degrees-of-invalidity suitable for determination of the processing instruction datasets are stored according to each of the processing instruction datasets, and a degree-of-invalidity for a selected type is calculated, for each of the processing instruction datasets to be determined, and wherein the degree-of-invalidity is defined as a function that decreases as a change in the input image before and after processing performed on the input image based on the processing instruction datasets increases.

* * * * *

UNITED STATES PATENT AND TRADEMARK OFFICE
CERTIFICATE OF CORRECTION

PATENT NO.         : 9,813,640 B2
APPLICATION NO.    : 14/954559
DATED              : November 7, 2017
INVENTOR(S)        : Naoyuki Miyashita It is certified that error appears in the above-identified patent and that said Letters Patent is hereby corrected as shown below:

On the Title Page

Item (54) and in the Specification, Column 1, Line 4, (Title), after "RECORDING" insert -- MEDIUM --.

Signed and Sealed this
Eighth Day of May, 2018

Andrei Iancu
*Director of the United States Patent and Trademark Office*